United States Patent [19]
Matthews et al.

[11] Patent Number: 5,763,911
[45] Date of Patent: Jun. 9, 1998

[54] MICRO-CELLULAR CAPACITOR FOR USE IN IMPLANTABLE MEDICAL DEVICES

[75] Inventors: M. Dean Matthews, Saratoga; Benjamin D. Pless, Atherton, both of Calif.

[73] Assignee: Pacesetter, Inc., Sunnyvale, Calif.

[21] Appl. No.: 658,431

[22] Filed: Jun. 5, 1996

[51] Int. Cl.$^6$ ............................................. H01L 27/108
[52] U.S. Cl. .......................... 257/301; 257/202; 257/208; 257/296; 257/300; 257/309; 257/503; 257/532; 257/905; 257/908; 257/909
[58] Field of Search ............................ 257/296, 300, 257/303, 306, 309, 202, 208, 301, 503, 532, 905, 908, 909

[56] References Cited

U.S. PATENT DOCUMENTS

| | | | |
|---|---|---|---|
| 5,238,529 | 8/1993 | Douglas | 156/635 |
| 5,238,530 | 8/1993 | Douglas et al. | 156/635 |
| 5,300,801 | 4/1994 | Blalock et al. | 257/309 |

OTHER PUBLICATIONS

"HDP-CVD: Trying to Lasso Lightning", Korczynski, *Solid State Technology*, Apr. 1996, pp. 63–73.

"Options for Multilevel Metallization", Butler, *Solid State Technology*, Mar. 1996, pp. S7–S10.

"Ion Bombardment Texturing of Surfaces: Technological Applications and Importance in Experimental Techniques", *Ion Bombardment Modification of Surfaces, Fundamentals and Applications*, Auciello, et al., 1984, pp. 435–466.

"Siko—A New Capacitor Technology Based on Porous Silicon", Lehmann, et al., *16th Capacitor and Resistor Technology Symposium*, Mar. 11–15, 1996, pp. 126–130.

"A New Capacitor for Technology Based on Porous Silicon", Lehmann, et al., *Solid State Technology*, Nov. 1995, pp. 99–102.

Primary Examiner—Valencia Martin Wallace
Attorney, Agent, or Firm—Steven M. Mitchell; M. Elizabeth Bush

[57] ABSTRACT

A capacitor optimized for use in an implantable medical device such as an implantable defibrillator is disclosed. In its simplest form, the capacitor comprises a thin planar dielectric sheet that has an array of cells open to one or both sides. Metallization is applied to the surface of the cells such that the walls of adjacent cells form a capacitor with the wall that separates the cells serving as the dielectric. The metallization pattern that forms the electrical connection to the cells may be patterned to limit the allowable current flow to each individual cell, thereby providing a fuse in the case of local dielectric failure.

30 Claims, 8 Drawing Sheets

MICRO-CELLULAR CAPACITOR FOR USE IN IMPLANTABLE MEDICAL DEVICES

FIELD OF THE INVENTION

This invention relates to capacitors for use in implantable medical devices, and specifically to a capacitor using a dielectric material with high dielectric strength.

BACKGROUND OF THE INVENTION

Capacitors that are used in implantable medical devices are required to have a high energy density since it is desirable to minimize the overall size of the implanted device. This is particularly true of implantable defibrillators since the high voltage capacitors used to deliver the defibrillation pulse contribute as much as one third of the implantable device volume. All of the defibrillators that are currently in use employ aluminum electrolytic capacitors. These electrolytic capacitors have an energy density of less than 2 joules/cm$^3$. Additionally, the cylindrical shape of these capacitors is unwieldy from a packaging standpoint. A new electrolytic capacitor with a flat geometry is disclosed in U.S. Pat. No. 5,131,388 to Pless et al. While such flat capacitors will provide significant improvement from a packaging and energy density standpoint, the energy or power density may still be improved.

In addition to the capacitor constructions discussed above, other traditional capacitor technologies such as ceramic and polymer film dielectric capacitors have also been considered, each having advantages and disadvantages.

There are a number traditional structures used in the construction of ceramic capacitors, as discussed in Engineered Materials Handbook, volume 4: Ceramics and Glasses; pp. 1112–1118; ASM International, 1991, which is incorporated herein by reference.

Disk capacitors use a single dielectric layer with a typical thickness greater than 50 microns. The mechanical problems associated with very thin substrates place a lower limit on the practical thickness of the dielectric in such disk capacitors. Disk capacitors are thus able to attain high energy density only at working voltages greater than 1,000 volts, making them unsuitable for use in implantable medical devices such as defibrillators requiring working voltages of 750 volts or less.

Barrier layer capacitors are capable of attaining high capacitance in thick ceramic sections by using part of the ceramic body as a conductor, thereby reducing the thickness of the dielectric. Barrier layer capacitors do not have the mechanical problems associated with disk capacitors; however, the overall energy density suffers since the electrically conductive portion of the ceramic does not contribute to energy storage. In typical surface barrier layer and grain boundary barrier layer capacitors, the electrically conductive ceramic is a significant fraction of the total volume, thus limiting the energy density. In barrier layer capacitors it is also difficult to optimize the performance of the dielectric and electrically conductive regions of the ceramic since they are based on the same material. The dielectric and conductive properties are achieved through diffusion dependent oxidation/reduction reactons.

Multilayer ceramic capacitors (MLCs) are able to combine good mechanical properties and thin dielectric layers by using a cofired structure that contains many dielectric layers. Dielectric layers with thicknesses of less than 25 microns are attainable. The major drawback of MLCs is that optimization of the dielectric properties requires firing with a high partial pressure of oxygen, whereas the metal electrode cannot tolerate high oxygen pressures unless it consists of a noble metal such as platinum. Further, the nature of the production processes (e.g. screen printing and tape casting) used in MLCs does not lend itself to close tolerances and reproducibility when extremely thin dielectric layers are used. The time and temperature involved in the cofiring process produce a diffuse interface between the electrode and dielectric. As the thickness of the dielectric layer is reduced, the negative impact of the diffuse interface on the capacitor performance increases.

In order to maximize the energy density in a capacitor, the dielectric thickness should be such that the electric field in the dielectric at the working voltage of the capacitor is an appreciable fraction of the dielectric breakdown field. For a defibrillator, the maximum working voltage is about 750 volts. In view of the >65 MV/m breakdown strength cited in U.S. Pat. No. 5,337,209, the dielectric thickness for a capacitor with a field strength of 80% of the breakdown value would be about 15 microns thick. Intrinsic breakdown voltages for ceramic materials are usually measured using sputtered or evaporated electrodes. However, due to the thin dielectric layers required at low working voltages, capacitors are usually fabricated with co-fired electrodes that are inferior to sputtered or evaporated electrodes. Intrinsic breakdown voltages for pure ceramic materials are typically higher for single crystal materials than they are for polycrystalline materials. The fabrication process for cofired MLCs is restricted to the use of polycrystalline materials.

Another drawback of MLCs is that an electrical breakdown of any of the dielectric layers in the capacitor usually results in the destruction of the capacitor since there is no mechanism to limit the breakdown current and isolate the defective portion of dielectric.

Polymer film capacitors have the attractive property of being "self-clearing". The thin metallization that constitutes the electrode on the polymer film dielectric is easily disrupted at high current densities. When breakdown of the polymer occurs, the current density in the vicinity of the dielectric failure disrupts the metallization, thereby isolating the defective portion of the dielectric. Thus in polymer film capacitors, an individual dielectric breakdown event produces a small loss of capacitance, but the device remains functional as opposed to the destruction of a ceramic capacitor. The disadvantage of polymer film capacitors is that the dielectric constant of polymer materials is far lower than that of ceramic materials. Consequently, the polymer dielectric must be much thinner than ceramic dielectrics at equivalent voltages if the energy density is to be equivalent. Although polymer films are immune to the mechanical problems that plague brittle ceramics, there are problems associated with handling large areas of extremely thin films.

Although dielectric ceramic materials have been developed that are capable of high energy storage density, the current art does not provide a capacitor that can utilize the full energy storage potential of the material, nor does the current art provide a multilayer ceramic capacitor that is capable of maintaining functionality after local dielectric breakdown. The current art of polymer capacitors does not provide a compact structure that can be processed to produce a capacitor.

Accordingly, it is an object of the invention to provide a capacitor that can be fabricated with a very thin working dielectric that has a high energy storage density.

Another object is to provide a compact dielectric structure that can be used to fabricate a capacitor with high capacitance density and/or energy density.

A further object of the invention is to provide a ceramic capacitor capable of maintaining functionality after local dielectric failure.

SUMMARY OF THE INVENTION

A micro-cellular capacitor optimized for use in an implantable medical device such as an implantable defibrillator is disclosed. The capacitor comprises a dielectric substrate having first and second cell arrays with each cell extending into a surface of the substrate, and being formed by a plurality of walls in the substrate. A conductive coating is applied to the wall surfaces of the cells of each array and the conductive coatings of the cells of the respective arrays are electrically coupled together. The cells are arranged in the substrate in a manner such that cells from the first array share some common walls with cells from the second array. These common walls provide the dielectric to serve as capacitive elements for the capacitor. The cell arrays may be open to one or both sides of the substrate. In one embodiment of the invention, the cells of each array are open to only one surface of the substrate while in another embodiment of the invention the cells extend completely through the substrate from one surface to the other. Various cell array patterns may be used to provide the common walls between cells of the two arrays. Alternating parallel rows can be used with cells extending from one or both surfaces. A somewhat more efficient arrangement is for cells of each row to be alternately from one array and then the other. Adjacent rows have the cells arranged side by side cells from the other array. Thus, for rectangular cells, each of the interior cells shares all four side walls with an adjacent cell of the other array. With each array extending from opposite surfaces of the substrate, each conductive coating can cover a substantial portion of the substrate surface so that the bottom walls of the cells also serve as capacitive elements. Further, the edges of the substrate can have a conductive coating to utilize even more of the substrate as dielectric material for the capacitor.

In a preferred embodiment of the invention, the capacitor comprises a number of planar substrates in a layered configuration. Depending on the array configuration, the layers may be arranged with "top" to "top" or with "bottom" to "top". This layered structure may be shaped to conform to the shape of the medical device housing for improved packaging efficiency.

In another preferred embodiment of the invention, the conductive coating which connects the individual cells may be patterned to limit the allowable current flow to each cell, thereby providing a fuse for each cell in the case of local dielectric failure.

The substrate can be a single crystal or polycrystalline ceramic material or a polymer film. The conductive coating can be a metallization layer or a conductive oxide.

BRIEF DESCRIPTION OF THE DRAWINGS

The various features and advantages of the present invention may be more readily understood with reference to the following detailed description taken in conjunction with the accompanying drawings in which.

DETAILED DESCRIPTION OF THE INVENTION

Figure 1:
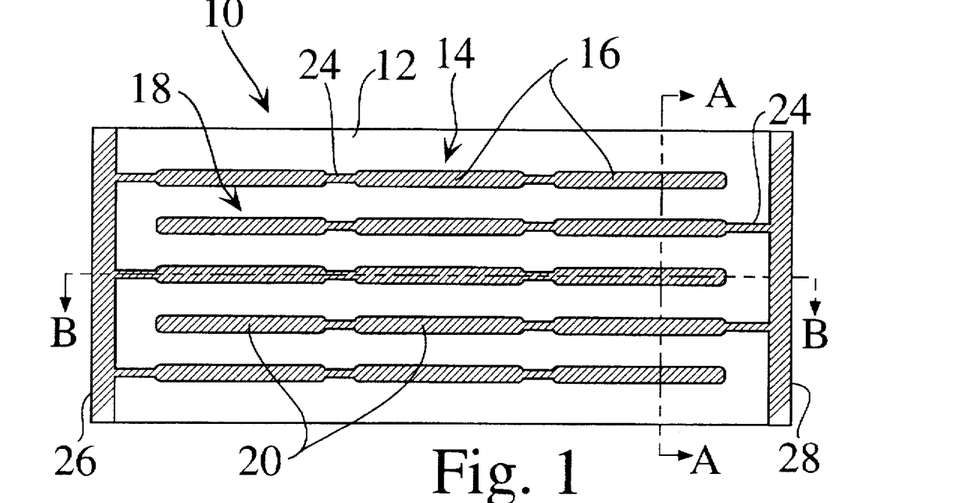
FIG. 1 shows a top plan view of a single dielectric layer of the invention with a cell pattern on one side with inline interconnects.
Figure 2:
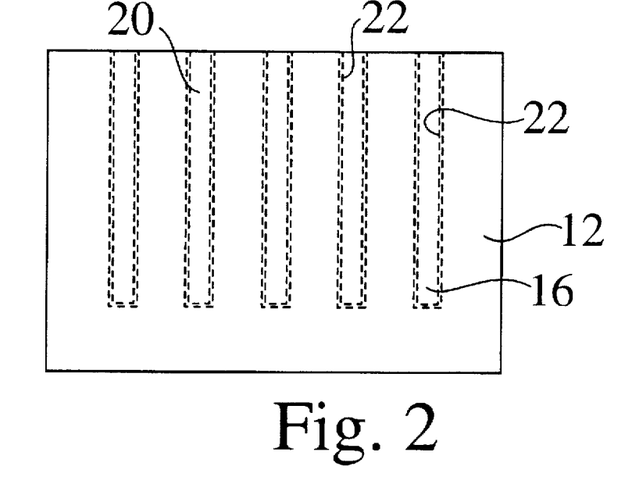
FIG. 2 is a side sectional view of the dielectric layer of FIG. 1 along line A—A.
Figure 3:
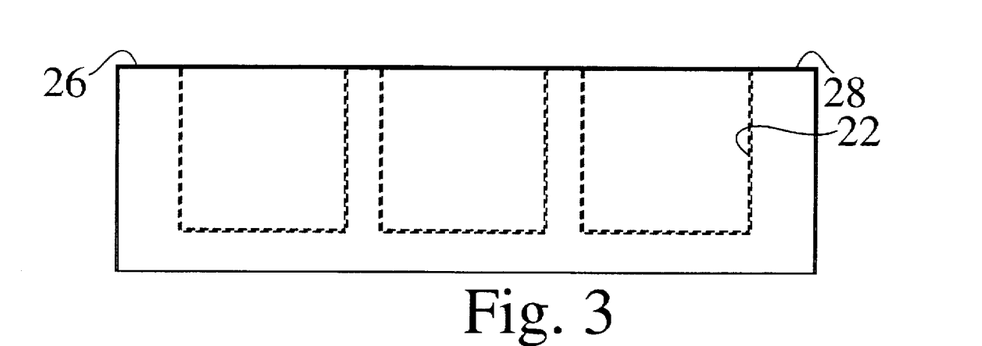
FIG. 3 is a front sectional view of the dielectric layer of FIG. 1 along line B—B.

FIG. 1 shows a top plan view of a microcellular capacitor 10 of the invention consisting of a dielectric substrate 12 containing a first array 14 of cells 16 and a second array 18 of cells 20. FIG. 2 is a side sectional view of the dielectric layer of FIG. 1 along line A—A and FIG. 3 is a front sectional view of the dielectric layer of FIG. 1 along line B—B. Each cell 16, 20 comprises a plurality of wall surfaces 22 which have conductive coatings applied thereto. This may be a metallization layer or a conductive oxide as discussed more fully below. The cells 16, 20 of each array 14, 18 are electrically connected adjacent cells with interconnects 24 and each line of cells is connected to a respective one of electrodes 26, 28. The electrical connections to the cells 16, 20 are made such that a significant fraction of the walls separating adjacent cells have one surface connected to each electrode, thereby forming a capacitive element. In the embodiment of the invention shown in FIGS. 1-3, each cell has at least one wall serving as a capacitive element and at most two walls serving as a capacitive element. The capacitance is obtained principally through the long walls of the cells, with the short walls making a very small contribution through fringing effects. The cell and electrode interconnect pattern is straightforward and relatively simple to implement. However, stand off requirements between cells of opposite potentials at high voltages may require a coating of a high dielectric strength material such as poly-p-xylylene. This will also be the case for those embodiments of the invention where cells extend completely through the substrate.

The cells of the dielectric can be produced using a number of processes. The preferred method for producing the cells is by photolithography. A layer of photoresist is applied to the dielectric substrate and the photoresist is patterned by exposure through a mask. The developed photoresist pattern is then used to mask the substrate surface during etching. Ion beam milling, or, depending upon the type of dielectric used, material specific processes such as reactive ion beam etching, reactive ion etching and wet chemical etching can be used to remove material from the substrate to form the cells. Additionally, a layer of metal can be applied prior to the application of the photoresist so that additional masking can be provided. In this case, an etching process specific to the metal is used to reproduce the photoresist pattern in the metal prior to the dielectric removal step.

In order to obtain straight walls and good transfer of the photomask pattern to the substrate, a highly anisotropic etch is desired. Reactive ion beam etching (RIBE) using halocarbons is a preferred dry etching process. In RIBE, ions are extracted from a discharge and accelerated towards the substrate. The etching process combines chemical attack with physical sputtering. This process can thus provide a high aspect ratio (the ratio of the depth to width of the etched feature) for the cells which is desirable for the invention. Applicable dry etching processes are discussed in "Ion Bombardment Modification of Surfaces, Fundamentals and Applications" edited by Auciello, O. and Kelly, R, Elsevier 1984 which is incorporated herein by reference. A preferred anisotropic wet etching process for titanates is disclosed in U.S. Pat. No. 5,238,530, which patent is incorporated herein by reference. In this process, a masked substrate is immersed in an aqueous etchant such as hydrochloric acid and illuminated with high intensity light. The unmasked portions of the substrate are preferentially etched due to the activation provided by the incident light.

After the cell pattern has been etched in the substrate, further photolithography is used to define the interconnect pattern and provide windows for coating the cell surfaces. The preferred method for coating of the cell surfaces is high density plasma chemical vapor deposition (HDP-CVD) as described in Solid State Technology, v. 39, no. 4, pp. 63–73. HDP-CVD is a simultaneous combination of the processes of deposition and etching which provide a desired coating structure. A preferred method for coating and filling the cells is the aluminum forcefill process disclosed in Solid State Technology v. 39 no. 3, pp. S7–S10. Both references are incorporated herein by reference. In the forcefill process, aluminum is sputter-deposited at a high rate to seal each cell, leaving a void in the cell. A high-pressure chamber then applies about 60 Mpa to the substrate at typical temperatures of about 400° C. to fill the sealed cells. Soft metals such as indium and tin can be used in place of aluminum with the forcefill process.

The cell wall surfaces 22 and the interconnects 24 can be coated with a metal or a conductive oxide such as ruthenium oxide, doped tin oxide or doped indium oxide.

Figure 4:
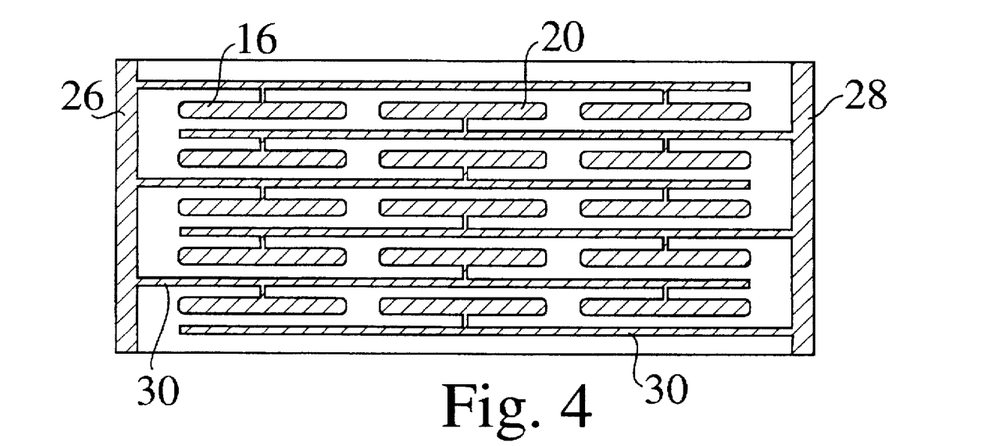
FIG. 4 shows a top plan view of a single dielectric layer of the invention with a cell pattern on one side with alternating interconnects.

The pattern in FIGS. 1–3 is straightforward and allows for maximum separation between the interconnects to opposing electrodes; however, the capacitance is not as high as that provided by the more complex pattern shown in FIG. 4 Here, interconnect lines 30 run parallel to the cell arrays. Each row of cells alternates between cells of array 14 and cells of array 18 and each cell is positioned beside a cell of the other array. Thus, in FIG. 4, each exterior cell has a minimum of two walls serving as capacitive elements and each interior cell has all four walls serving as capacitive elements.

Figure 5:
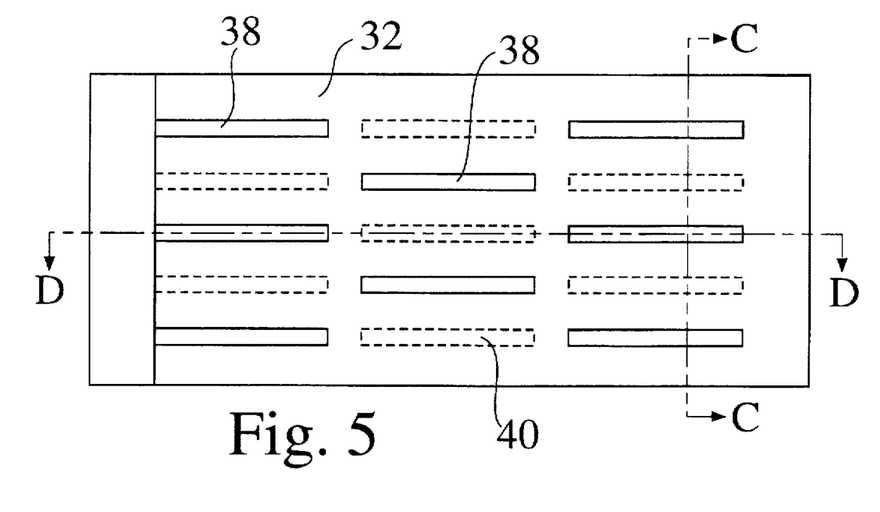
FIG. 5 shows a single dielectric layer with cell arrays on opposite sides with substantially full surface metallization.
Figure 6:
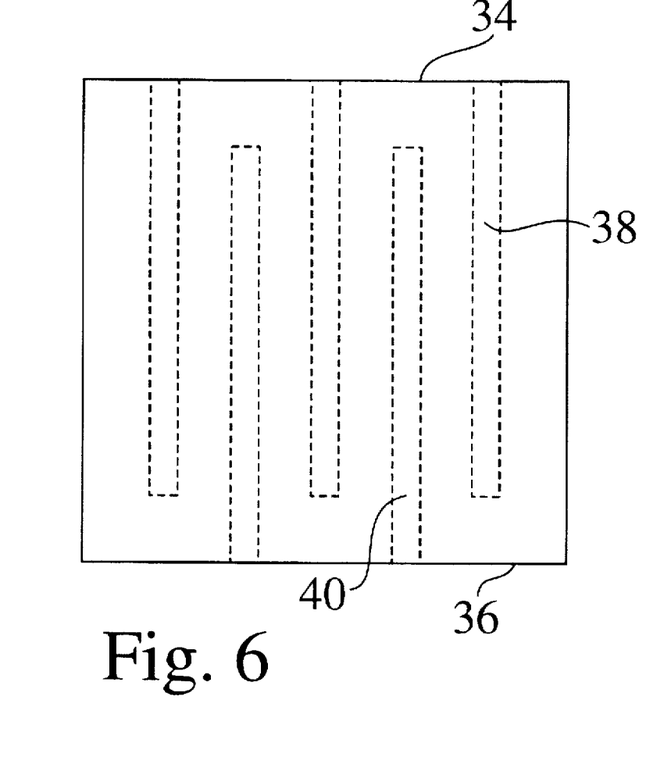
FIG. 6 is a side sectional view of the dielectric layer of FIG. 5 along line C—C.
Figure 7:
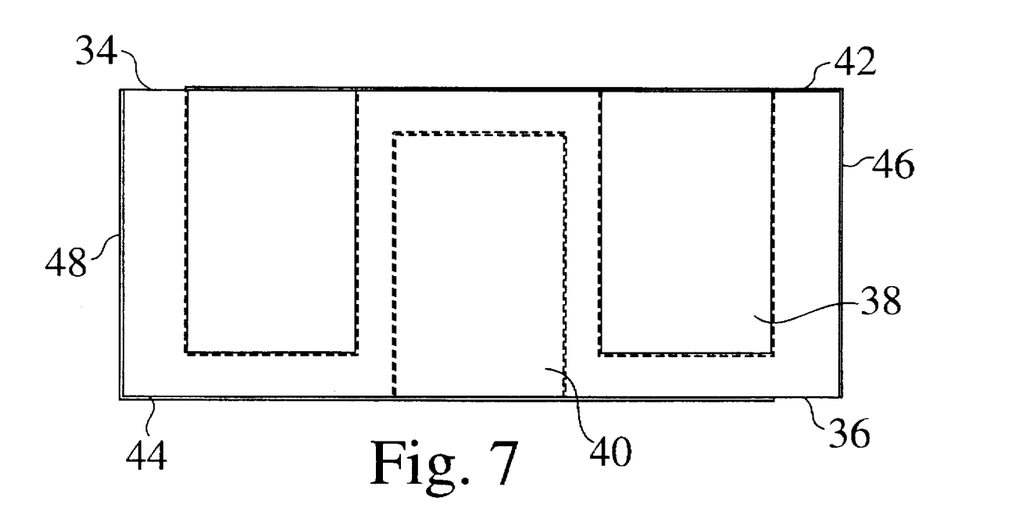
FIG. 7 is a front sectional view of the dielectric layer of FIG. 5 along line D—D.

The maximum capacitance configuration for the invention is shown in FIGS. 5–7. A dielectric substrate 32 is shown having a top surface 34 and a bottom surface 36. On the top surface 34, an array of cells 3 8 is configured so that it is interlaced with an array of cells 40 on the bottom surface 36. Electrodes 42 and 44 substantially cover the opposing surfaces of the dielectric substrate and wrap around two opposing edges 46 and 48, respectively. In this configuration the bottom of each cell serves as a capacitive element with the opposing surface in addition to the capacitance obtained with the walls between adjacent cells of the two arrays. Overall capacitance and the separation between opposing interconnects is maximized.

Figure 8:
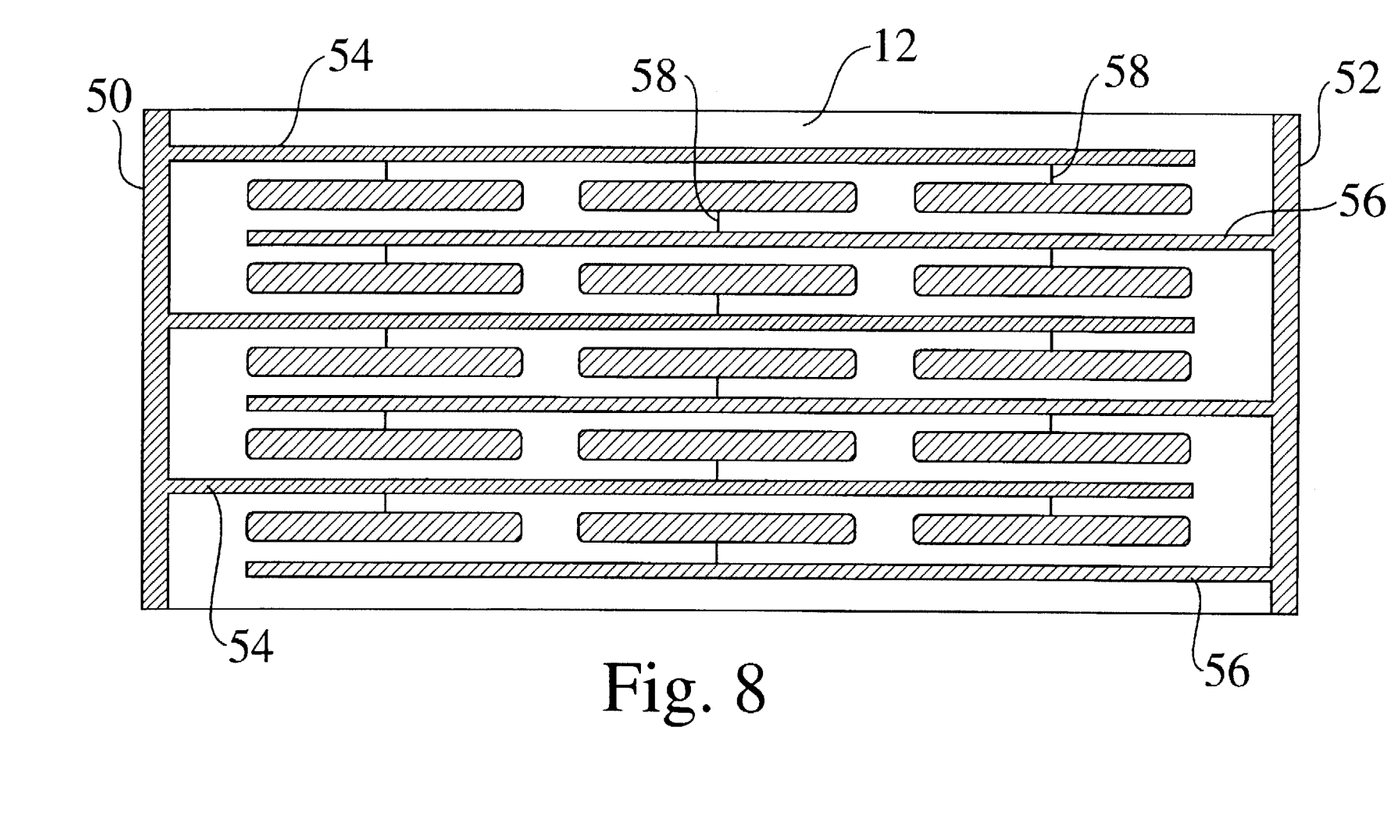
FIG. 8 shows a single dielectric layer surface with patterned metallization for a fused capacitor with cells on one surface of the dielectric layer.

FIG. 8 shows a single dielectric layer surface 12 with patterned metallization for a fused capacitor with cells on one surface of the dielectric layer. This provides a high reliability electrode pattern consisting of two electrodes 50 and 52 coupled to groups of linear interconnects 54, 56 respectively, that are connected to the individual cells by individual fusible links 58. The fusible links 58 consist of a conductive element with a limited current carrying capacity. The rise in current that accompanies local dielectric failure opens up the fusible link thus isolating the cell with the failed dielectric from the array. Because of the massive parallelism involved in the microcellular capacitor, the resistance of the individual links can be quite high.

Figure 9:
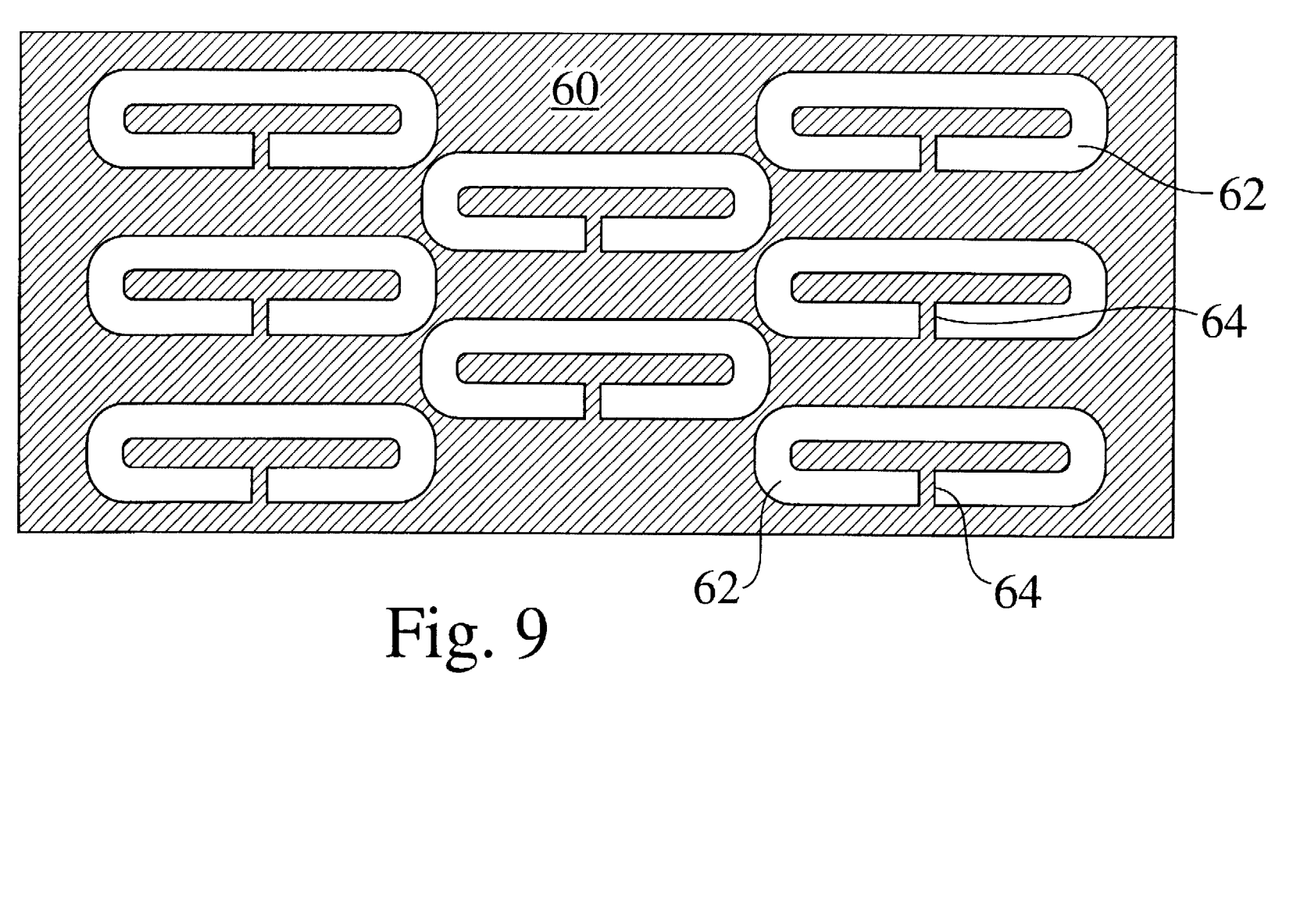
FIG. 9 shows a single dielectric layer surface with patterned metallization for a fused capacitor with cells on both surfaces of the dielectric layer.

FIG. 9 shows a single dielectric layer surface with patterned metallization for a fused capacitor with cells on both surfaces of the dielectric layer. Here, each surface 60 of the dielectric is substantially completely metallized except for a non-metallized boundary 62 surrounding each cell. Each cell has a fusible link 64 connecting it to the metallized surface 60.

Figure 10:
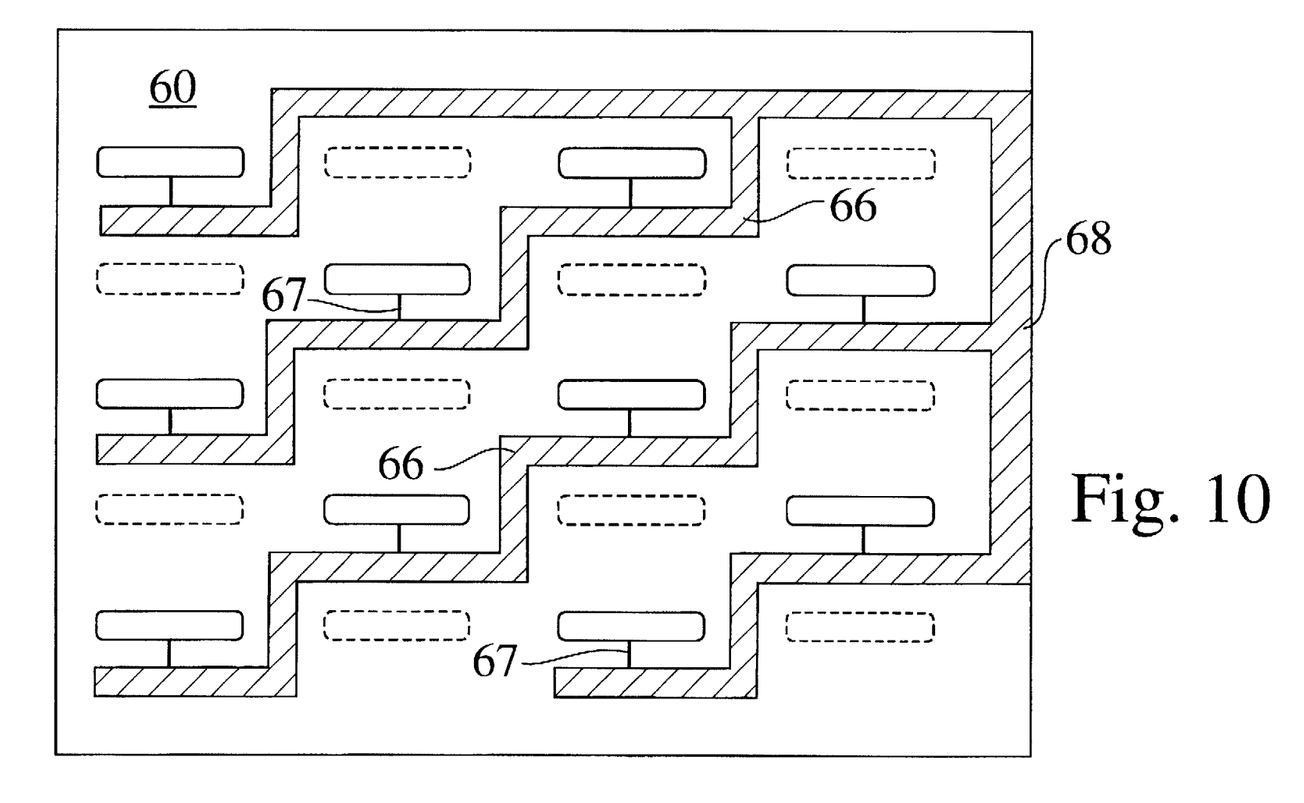
FIG. 10 shows a single dielectric layer surface with another patterned metallization for a fused capacitor with cells on both surfaces of the dielectric layer.

FIG. 10 shows another single dielectric layer surface with patterned metallization for a fused capacitor with cells on both surfaces of the dielectric layer. Each surface 60 of the dielectric has a plurality of adjacent step-like interconnects 66 which connect the individual cells of the arrays. A fusible link 67 connects each cell to the nearest interconnect 66. Each surface 60 of the dielectric has an edge electrode 68.

Figure 11:
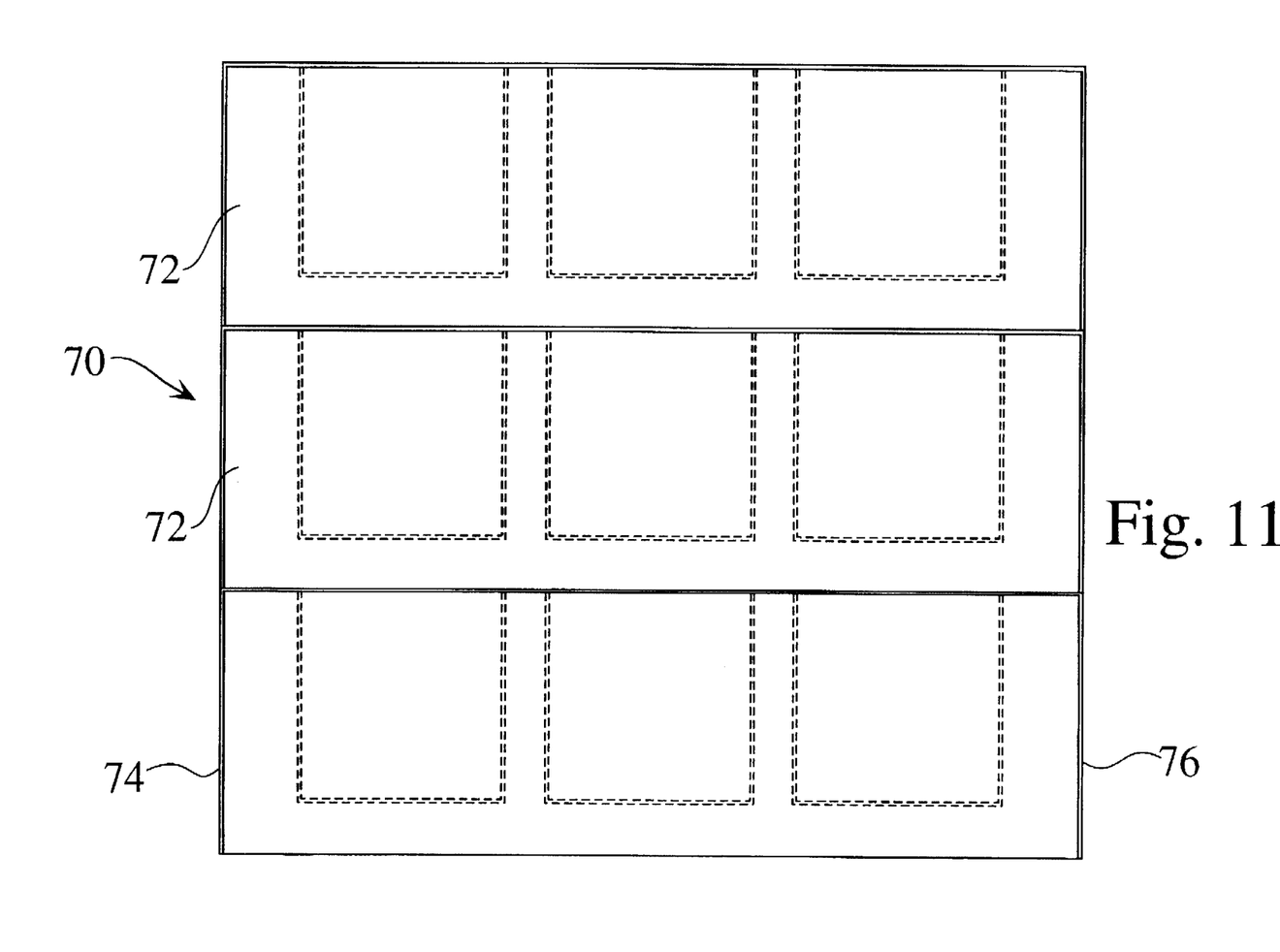
FIG. 11 shows a side sectional view of a multilayer capacitor consisting of a stack of dielectric layers similar to that in FIG. 1.

FIG. 11 shows a side sectional view of a multilayer capacitor 70 consisting of a stack of dielectric layers 72 similar to the ones disclosed above with regard to FIGS. 1–3. Edge electrodes 74 and 76 are provided to connect the cell arrays of each layer 72 together. An actual capacitor could consist of many such layers.

Figure 12:
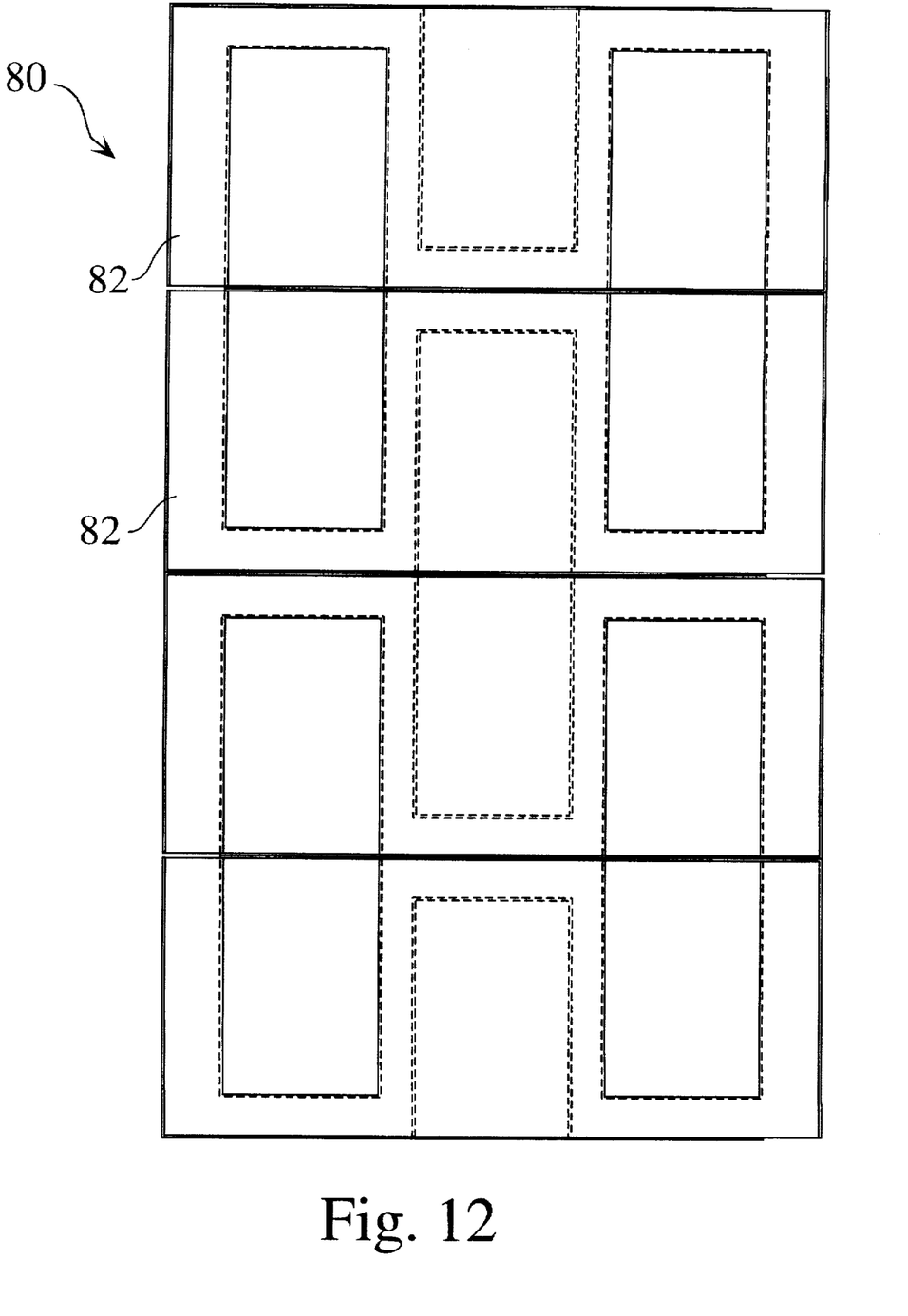
FIG. 12 shows a side sectional view of a multilayer capacitor consisting of a stack of dielectric layers similar to that in FIG. 5.

FIG. 12 shows a side sectional view of a multilayer capacitor 80 consisting of a stack of dielectric layers 82 similar to the ones disclosed above with regard to FIGS. 5–7. Alternate layers are flipped with respect to each other such that "top" surfaces face each other and "bottom" surfaces face each other.

A significant advantage of the microcellular structure is that it allows extremely small working dielectric thicknesses on the order of a few microns to be obtained without having to handle extremely thin planar structures. The microcellular structure is similar to the honeycomb cellular structure that is used in load bearing structures that must have a high strength-to-weight ratio.

The microcellular structure is highly adaptable to standard semiconductor wafer fabrication techniques and since the critical design features are on the order of a few microns, the dimensional requirements for the type of capacitor suitable for implantable medical devices fit well within the limits of established technology.

Additionally, a single crystal dielectric can be used to fabricate the capacitor. The use of a single crystal substrate eliminates the inhomogeneity introduced by grain boundaries in polycrystalline materials. The homogeneity of single crystals as opposed to polycrystalline materials makes it easier to maximize a material property over a narrow temperature range. Since the service temperature range of implantable medical devices is quite narrow, a material with a large peak in its dielectric constant that would be unsuitable for general applications might be considered advantageous in a medical implant. Also, it has been noted with respect to dielectric strength that "For single crystals tested with carefully designed electrodes and suitable precautions, values up to 10,000 V/mil (approximately $4 \times 10^6$ V/cm) are observed." (Introduction to Ceramics, W. D. Kingery, H. K. Bowen and D. R. Uhlmann, 1976).

Since high temperature processes such as binder burnout and sintering are not required in the construction of the microcellular capacitor, the electrode/dielectric interface can be controlled to a higher degree than in conventional ceramic capacitors. Undesirable diffusion and interaction can be greatly reduced. Also, there are fewer compatibility constraints with respect to dielectric/electrode material systems.

It should be understood that various alternatives to the embodiments of the invention described herein may be employed in practicing the invention. For example, the invention may be used to provide on chip capacitors for use in integrated circuits or on substrate capacitors in a multi-chip module. It is thus intended that the following claims define the scope of the invention and that structures and methods within the scope of these claims and their equivalents be covered thereby.

We claim:

1. A micro-cellular capacitor comprising:

a dielectric substrate having first and second cell arrays in said substrate, each of said arrays including a plurality of cells, each cell formed by a plurality of walls in said substrate, each cell including a plurality of wall surfaces and at least some of said cells of said first array being positioned to share at least one common wall with a cell of said second array;

a first conductive coating covering at least some of said wall surfaces of said common walls of said cells of said first array; and a second conductive coating electrically isolated from said first conductive coating and covering at least some of said wall surfaces of said common walls of said cells of said second array;

whereby said common walls provide a dielectric to serve as capacitive elements for said capacitor.

2. The micro-cellular capacitor of claim 1 wherein said substrate has a planar configuration with first and second surfaces and wherein cells of said first and second cell arrays extend into said substrate from said first surface.

3. The micro-cellular capacitor of claim 2 wherein said first conductive coating extends along said first substrate surface electrically connecting said cells of said first cell array and said second conductive coating extends along said first substrate surface electrically connecting said cells of said second cell array.

4. The micro-cellular capacitor of claim 3 wherein said first cell array comprises a plurality of cells extending from a first edge of said substrate in a generally linear cell pattern and said second cell array comprises a plurality of cells extending from a second opposite edge of said substrate in a generally linear cell pattern parallel to said first cell array.

5. The micro-cellular capacitor of claim 4 wherein said first cell array comprises a plurality of said generally linear cell patterns and said second cell array comprises a plurality of said generally linear cell patterns with said respective linear cell patterns alternating across said substrate first surface.

6. The micro-cellular capacitor of claim 3 wherein said first cell array comprises a plurality of cells extending from a first edge of said substrate and said second cell array comprises a plurality of cells extending from a second opposite edge of said substrate with said cells forming a plurality of generally linear parallel rows with each row comprising cells in alternating sequence from said first and second arrays.

7. The micro-cellular capacitor of claim 1 wherein said first and second conductive coatings comprise metallization layers.

8. The micro-cellular capacitor of claim 1 wherein said first and second conductive coatings comprise conductive oxide layers.

9. The micro-cellular capacitor of claim 1 wherein said first conductive coating comprises a conductive oxide layer and said second conductive coating comprises a metallization layer.

10. The micro-cellular capacitor of claim 1 wherein said substrate has a planar configuration with first and second substrate surfaces and wherein cells of said first cell array extend into said substrate from said first surface and cells of said second cell array extend into said substrate from said second surface with said arrays offset from each other in a manner to share common walls.

11. The micro-cellular capacitor of claim 10 wherein said first conductive coating extends along said first substrate surface electrically connecting said cells of said first cell array and said second conductive coating extends along said second substrate surface electrically connecting said cells of said second cell array.

12. The micro-cellular capacitor of claim 11 wherein said first conductive coating extends from a first edge of said substrate and covers a substantial portion of said first substrate surface and said second conductive coating extends from a second opposite edge of said substrate and covers a substantial portion of said second substrate surface and wherein said first cell array comprises a plurality of cells in a generally linear cell pattern extending from said first edge and said second cell array comprises a plurality of cells in a generally linear cell pattern extending from said second opposite edge of said substrate substantially parallel to said first cell array.

13. The micro-cellular capacitor of claim 12 wherein said first conductive coating covers a substantial portion of said first substrate edge and said second conductive coating covers a substantial portion of said second substrate edge.

14. The micro-cellular capacitor of claim 13 wherein said first conductive coating further covers a substantial portion of a third substrate edge and said second conductive coating further covers a substantial portion of a fourth substrate edge.

15. The micro-cellular capacitor of claim 12 wherein said first cell array comprises a plurality of said generally linear cell patterns and said second cell array comprises a plurality of said generally linear cell patterns with said respective linear cell patterns alternating across said substrate.

16. The micro-cellular capacitor of claim 11 wherein said first cell array comprises a plurality of cells extending from a first edge of said substrate and said second cell array comprises a plurality of cells extending from a second opposite edge of said substrate with said cells forming a plurality of generally linear parallel rows with each row comprising cells in alternating sequence from said first and second arrays.

17. The micro-cellular capacitor of claim 11 wherein said cells include bottom wall surfaces and wherein said first and second conductive coatings extend over at least a portion of said first and second substrate surfaces, respectively, whereby substrate dielectric material between first cell bottom walls and said second conductive coating and substrate dielectric material between second cell bottom walls and said first conductive coating serve as dielectric for said capacitor.

18. The micro-cellular capacitor of claim 1 wherein said substrate has a planar configuration with first and second substrate surfaces and wherein said first and second conductive coatings extend over at least a portion of one of said first and second substrate surfaces, each of said conductive coatings includes a surface portion patterned to electrically connect to the respective cells of each cell array wherein said patterned surface portions of said conductive coatings are configured to limit the allowable current flow to each of said cells thereby providing a fusible link for each cell.

19. The micro-cellular capacitor of claim 1 wherein said dielectric substrate comprises a single crystal.

20. A micro-cellular multilayer capacitor comprising:

a plurality of dielectric substrates in a layered configuration, each substrate having first and second cell arrays in said substrate, each of said arrays including a plurality of cells, each cell formed by a plurality of walls in said substrate, each cell including a plurality of wall surfaces and at least some of said cells of said first array being positioned to share at least one common wall with a cell of said second array;

a first conductive coating covering at least some of said wall surfaces of said common walls of said cells of said first array; and a second conductive coating electrically isolated from said first conductive coating and covering at least some of said wall surfaces of said common walls of said cells of said second array;

whereby said common walls provide a dielectric to serve as capacitive elements for said capacitor.

21. The capacitor of claim 20 wherein:

each of said substrates has a planar configuration with first and second surfaces;

cells of said first and second cell arrays extend into said substrate from said first surface; and said first conductive coating for each of said substrates extends along said first substrate surface electrically connecting said cells of said first cell array and said second conductive coating extends along said first substrate surface electrically connecting said cells of said second cell array.

22. The capacitor of claim 21 wherein said first conductive coatings from each of said substrates are electrically coupled together and said second conductive coatings from each of said substrates are electrically coupled together.

23. The micro-cellular capacitor of claim 22 wherein said first cell array for each of said substrates comprises a plurality of cells extending from a first edge of said substrate and said second cell array for each of said substrates comprises a plurality of cells extending from a second opposite edge of said substrate with said cells forming a plurality of generally linear parallel rows with each row comprising cells in alternating sequence from said first and second arrays.

24. The capacitor of claim 23 wherein said first conductive coatings from each of said substrates are electrically coupled together and said second conductive coatings from each of said substrates are electrically coupled together.

25. The capacitor of claim 20 wherein:

each of said substrates has a planar configuration with first and second substrate surfaces and wherein cells of said first cell array for each substrate extend into said substrate from said first surface and cells of said second cell array for each substrate extend into said substrate from said second surface with said arrays for each substrate offset from each other in a manner to share common walls; and for each substrate said first conductive coating extends along said first substrate surface electrically connecting said cells of said first cell array and said second conductive coating extends along said second substrate surface electrically connecting said cells of said second cell array.

26. The capacitor of claim 25 wherein each of said substrates is adjacent to at least one other of said substrates and alternating ones of said substrates are flipped such that for each adjacent pair of substrates either a first substrates surface faces a first substrate surface or a second substrate surface faces a second substrate surface.

27. The capacitor of claim 26 wherein said first conductive coatings from each of said substrates are electrically coupled together and said second conductive coatings from each of said substrates are electrically coupled together.

28. The capacitor of claim 20 wherein each of said substrates has a planar configuration with first and second substrate surfaces and wherein said first and second conductive coatings for each of said substrates extends over at least a portion of one of said first and second substrate surfaces, each of said conductive coatings including a surface portion patterned to electrically connect to the respective cells of each cell array wherein said patterned surface portions of said conductive coatings are configured to limit the allowable current flow to each of said cells thereby providing a fusible link for each cell.

29. The capacitor of claim 20 for use in an implantable defibrillator having a defibrillator housing wherein said layered configuration has an outside dimension comprising edges of said substrates, said outside dimension having a curvilinear shape generally conforming to a curvilinear shape of said defibrillator housing.

30. A substrate for use as part of an integrated circuit or hybrid circuit, said substrate containing a plurality of on-substrate capacitors, each of said capacitors comprising:

first and second cell arrays in said substrate, each of said arrays including a plurality of cells, each cell formed by a plurality of walls in said substrate, each cell including a plurality of wall surfaces and at least some of said cells of said first array being positioned to share at least one common wall with a cell of said second array;

a first conductive coating covering at least some of said wall surfaces of said common walls of said cells of said first array; and a second conductive coating electrically isolated from said first conductive coating and covering at least some of said wall surfaces of said common walls of said cells of said second array;

whereby said common walls provide a dielectric to serve as capacitive elements for each of said capacitors.

* * * * *